United States Patent
Manica (10) Patent No.: US 12,451,958 B2
(45) Date of Patent: Oct. 21, 2025

(54) APPARATUS AND METHOD FOR TIMED ULTRA-WIDEBAND DATA

(71) Applicant: Rockwell Collins, Inc., Cedar Rapids, IA (US)

(72) Inventor: Luca Manica, Trento (IT)

(73) Assignee: Rockwell Collins. Inc., Cedar Rapids, IA (US)

( * ) Notice: Subject to any disclaimer, the term of this patent is extended or adjusted under 35 U.S.C. 154(b) by 378 days.

(21) Appl. No.: 18/071,029

(22) Filed: Nov. 29, 2022

(65) Prior Publication Data

US 2023/0170981 A1  Jun. 1, 2023

(30) Foreign Application Priority Data

Nov. 29, 2021 (EP) ..................................... 21211133

(51) Int. Cl.
*H04B 7/185* (2006.01)
*H04B 7/17* (2006.01)

(52) U.S. Cl.
CPC ........... *H04B 7/18506* (2013.01); *H04B 7/17* (2013.01)

(58) Field of Classification Search
CPC ...... H04B 7/18506; H04B 7/17; H04B 1/717; H04B 1/71635
See application file for complete search history.

(56) References Cited

U.S. PATENT DOCUMENTS

| | | | | |
|---|---|---|---|---|
| 5,767,953 | A * | 6/1998 | McEwan | H01Q 19/106 356/5.03 |
| 10,225,039 | B2 | 3/2019 | Tollefson et al. | |
| 2005/0169388 | A1 * | 8/2005 | Toland | H04B 1/71635 375/259 |
| 2011/0084880 | A1 | 4/2011 | Sakai et al. | |
| 2012/0105276 | A1 * | 5/2012 | Ryland | G01S 13/9017 342/25 F |
| 2013/0141270 | A1 * | 6/2013 | Rodenbeck | G01S 13/0209 342/21 |
| 2020/0341108 | A1 * | 10/2020 | Heller | G01S 13/02 |

(Continued)

FOREIGN PATENT DOCUMENTS

| | | |
|---|---|---|
| CN | 102857280 B | 12/2014 |
| IN | 273045 B | 5/2016 |

OTHER PUBLICATIONS

Aggrawal, Himanshu et al. "Ultra-Wideband Joint Spatial Coding for Secure Communication and High-Resolution Imaging." IEEE Transactions on Microwave Theory and Techniques 65 (2017): 2525-2535.

(Continued)

*Primary Examiner* — Fred A Casca
(74) *Attorney, Agent, or Firm* — Suiter Swantz (57) ABSTRACT

A communication system comprising: a pulse generation system comprising one or more pulse repetition frequency (PRF) oscillators and one or more pulse generators, wherein each PRF oscillator is connected to a pulse generator, and wherein each pulse generator is configured to generate a pulse; and three or more transmitters 310*a*-N, wherein each transmitter is connected to the pulse generation system and wherein the pulse generation system is configured to send a pulse to each transmitter, each transmitter comprising: a pulse delay block configured to introduce a time delay to the pulse sent to the transmitter; and an antenna 314*a*-N.

17 Claims, 5 Drawing Sheets

(56) References Cited

U.S. PATENT DOCUMENTS

2020/0389206 A1 12/2020 Dowla et al.

OTHER PUBLICATIONS

Extended Search Report in European Application No. 21211133.0 dated May 9, 2022, 12 pages.
Lo, Yu-Tsung et al: "OOK/BPSK-Modulated Impulse Transmitters Integrated With Leakage-Cancelling Circuit", IEEE Transactions on Microwave Theory and Techiques, IEEE, USA, vol. 61, No. 1, Jan. 1, 2013 (Jan. 1, 2013), pp. 218-224, xp0111488065, ISSN: 0018-9480, DOI: 10.1109/TMTT.2012.2226746.
Martynenko et al: "A high band impulse radio UWB transmitter for communication and localization", ULTRA-WIDEBAD, 2009. ICUWB 2009. IEEE International Conference ON, IEEE, Piscataway, NJ, USA, Sep. 9, 2009 (Sep. 9, 2009), pp. 359-363, xp031547736, ISBN: 978-1-4244-2930-1.

* cited by examiner

APPARATUS AND METHOD FOR TIMED ULTRA-WIDEBAND DATA

CROSS-REFERENCE TO RELATED APPLICATIONS

The present application claims the benefit of European Patent Application No. 21211133.0, entitled APPARATUS AND METHOD FOR TIMED ULTRA-WIDEBAND DATA TRANSMISSION, filed Nov. 29, 2021, which is incorporated by reference in the entirety.

TECHNICAL FIELD

The present invention relates to an apparatus and method for wireless communications using timed arrays for data transmission.

BACKGROUND

Wireless communications present a unique challenge due to the possibility of the interception of transmissions sent over a wireless signal. Many methods of improving the security of such communications are known, including using software encryption. However, the use of encryption, particularly multiple layers of encryption, can increase the latency of communications. This is of particular concern when low-latency communications are crucial to the operation of a system.

One example of a situation in which low-latency communications are particularly important is that of Single Pilot Operation (SPO) of an aircraft. SPO is where only a single pilot pilots an aircraft, such as a commercial airliner. This situation is made possible due to increasing automation in flight controls. SPO requires a fast, reliable, resilient, and secure communication link between the aircraft and a ground station. Low-latency communications are important in maintaining a communication link between the pilot and the ground station.

One way of providing low-latency communications is by using Directional Modulation (DM). In DM, information is transmitted in a known and pre-defined secure direction and it is distorted in all other directions. Accordingly, only an authorized user located in a specific position can correctly decode the transmitted information.

DM can be implemented using Ultra-Wideband (UWB) technology. In H. Aggrawal, R. Puhl, C. Studer and A. Babakhani, "Ultra-Wideband Joint Spatial Coding for Secure Communication and High-Resolution Imaging," IEEE Transactions on Microwave Theory and Techniques, vol. 65, no. 7, pp. 2525-2535, 2017, an experimental set-up is used comprising a system with two UWB antennas. In this system, the performance of the system is estimated by means of experimental results without providing guidelines for system analysis and synthesis.

Therefore, there is a need for generalised and scalable transmitter architectures.

SUMMARY

According to a first aspect, the present invention provides a communication system comprising: a pulse generation system comprising one or more pulse repetition frequency (PRF) oscillators and one or more pulse generators, wherein each PRF oscillator is connected to a pulse generator, and wherein each pulse generator is configured to generate a pulse; and three or more transmitters, wherein each transmitter is connected to the pulse generation system and wherein the pulse generation system is configured to send a pulse to each transmitter, each transmitter comprising: a pulse delay block configured to introduce a time delay to the pulse sent to the transmitter; and an antenna.

The communication system of the first aspect may be for sending signals encoded with data. That is, the pulse generation system may be configured to encode data into pulses generated by the pulse generator, thereby creating encoded pulses. The encoded pulses may then be sent to each of the transmitters for transmission by the antennas.

The pulse generation system is configured to send a pulse to each transmitter. That is, the pulse generation system is connected to each transmitter in order to communicate pulses to each transmitter. Each transmitter may be connected to the pulse generation system by wired or wireless means capable of communicating one or more pulses generated by each of the one or more pulse generators to each of the transmitters. One pulse may be generated by the pulse generation system and sent to all of the transmitters. Alternatively, a plurality of pulses may be generated by the pulse generation system, in which case, the plurality of pulses may be distributed among the transmitters such that each of the transmitters may be sent one pulse of the plurality of pulses. A pulse may be defined as a short signal transmission.

The communication system may comprise a controller configured to control one or more of the following: pulse generation; the encoding of data into pulses; distribution of one or more pulses to each transmitter; the time delay of the pulse delay block in one or more of the transmitters.

Figure 1:
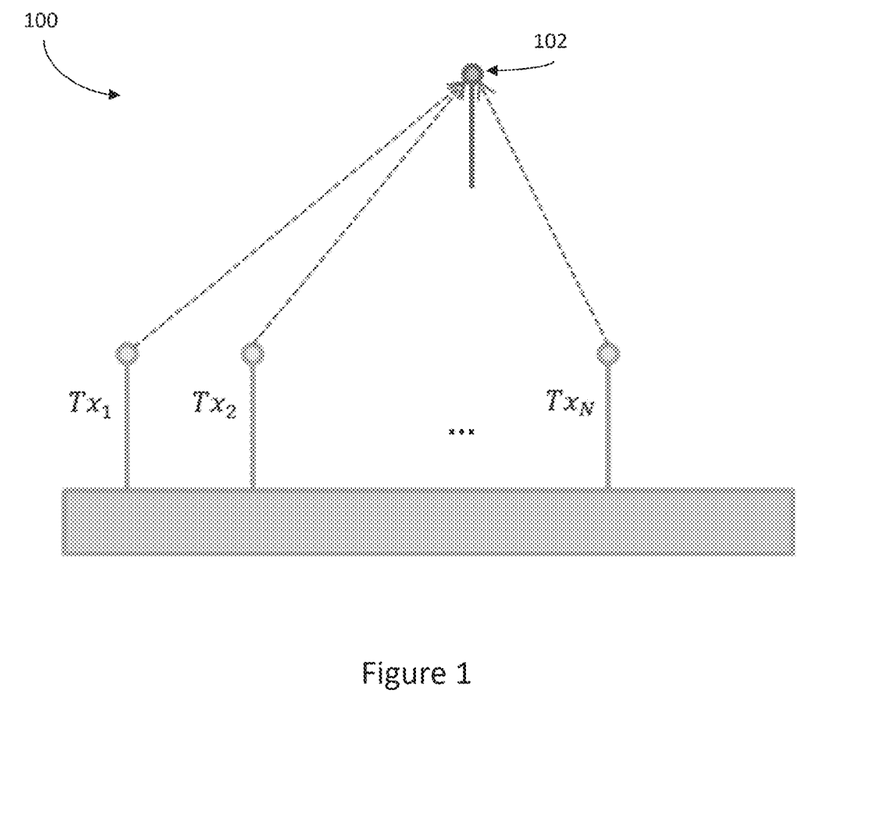
FIG. 1 illustrates the principle of joint spatial coding.

An advantage of the present invention is that it is able to transmit information using joint spatial coding through the use of timed arrays. FIG. 1 illustrates the basic principle of joint spatial coding. The communication system 100 of FIG. 1 is composed of N transmitting antennas $Tx_n$; n=1, 2, ..., N. A signal is split across the N transmitting antennas such that each of the antennas transmits a pulse representing a portion of the signal, or equivalently a portion of the data (or information) that is to be transmitted. Each antenna may transmit isotropically or directionally. The signal arriving at a receiver antenna 102 is the sum of the incoming pulses coming from the N transmitting antennas delayed by the travelling times $\tau_n$; n=1, ..., N that the pulses need to arrive at the receiver antenna 102 position from their respective antennas. Signal transmission can be configured such that two regions are defined: a first region where all of the pulses add constructively such that the original signal can be reconstructed, and a second region where the pulses overlap in a manner that does not result in the reconstruction of the original signal. Therefore, an advantage of joint spatial coding is that a receiver antenna in a location other than the intended receiver location will not be able to reconstruct the original signal, which provides security to data sent by the communications system 100.

Figure 2:
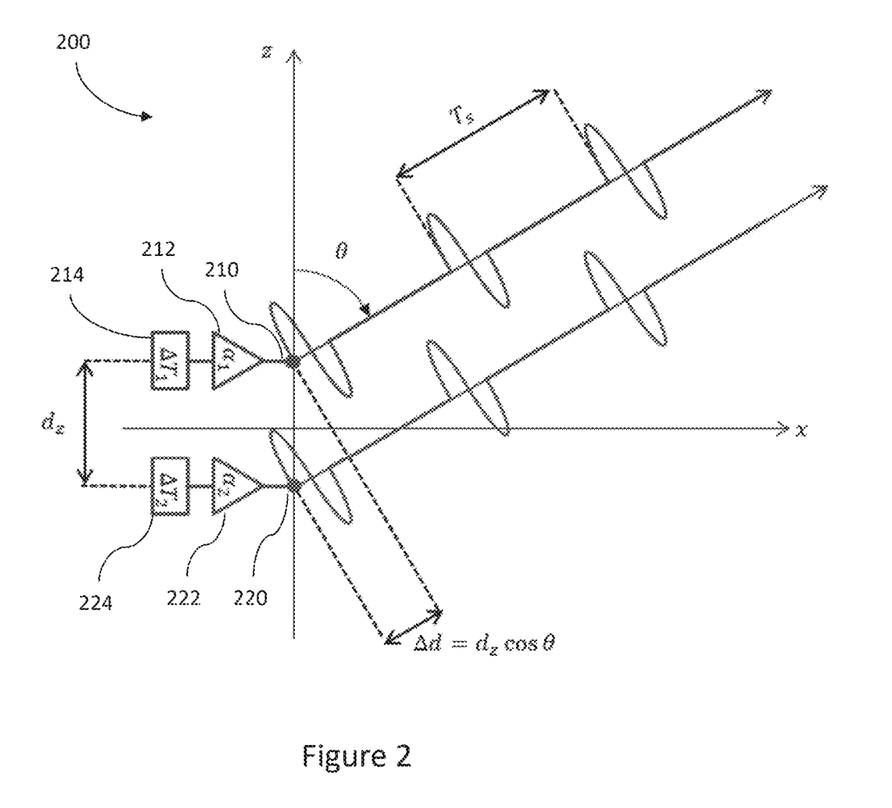
FIG. 2 illustrates the principle of timed arrays comprising two antennas.

The concept of a timed array is shown in FIG. 2. FIG. 2 shows an antenna array 200 comprising a first antenna 210 and a second antenna 220 lying on a z-axis, where $d_z$ is a distance separating the antennas 210, 220. The distance separating the antennas may be referred to as the element spacing, $d_z$. The first and second antennas 210, 220 are each connected to an amplifier 212, 222 with gain $\alpha_1$ and $\alpha_2$, respectively, and a delay block 214, 224 with delay $\Delta T_1$ and $\Delta T_2$, respectively. A pulse p(t) with period $T_s$ is transmitted by each of the antennas 210, 220 with an angle θ. The difference in the traveling distance of the two pulses is $\Delta d = d_z \cos θ$. The signal at the output of the array 200 is not frequency dependent. Instead, the signal is a function of the shape of the pulse transmitted (i.e. the waveform), the angle of arrival θ, the gain values $α_n$; n=1, 2, and of the element delays $ΔT_n$; n=1, 2.

The communication system of the first aspect may be configured to transmit information to an aircraft. The method may be used as part of a Single Pilot Operation (SPO) system of an aircraft. Additionally or alternatively, the communication system may be configured to transmit information to a land- or water-based vehicle, and/or to a fixed receiver. The receiver for receiving the signal from the communication system is preferably in the line of sight (LOS) of the communication system. If the receiver is not in the LOS of the communication system, the receiver may not receive the signal. LOS means that the path between the communication system and the receiver is not obstructed by the horizon or by obstacles.

The communication system may be an ultra-wideband (UWB) communication system, wherein the antennas are UWB antennas configured to transmit UWB pulses.

There are three or more transmitters. The communication system may comprise four or more transmitters, five or more transmitters, six or more transmitters, seven or more transmitters, or eight or more transmitters. Various specific array sizes may comprise 10, 20, or 40 transmitters, depending on the requirements of the system and the space available. An increase in the number of transmitters has an advantage of improving communications security.

The distance between the transmitters, also known as the "element spacing", has an inversely proportional relationship to the size of the beam. That is, the smaller the element spacing, the broader the beam. The minimum element spacing may be around 30 millimetres.

The duration of each individual pulse generated by a pulse generator may typically range from 0.1 to 2 nanoseconds. The duration of each pulse may be less than 0.1 nanoseconds or greater than 2 nanoseconds.

The element spacing may be dependent on the pulse duration. That is, if the communication system is configured to generate short pulses (e.g. below 0.1 nanoseconds), the element spacing may be less than 30 millimetres.

The Pulse Repetition Frequency (PRF) oscillator determines the pulse repetition frequency of the overall system. The PRF oscillator may be a crystal oscillator.

The pulse generator is configured to generate a pulse that may then be sent to one or more of the transmitters. The pulse have a short-duration waveform. Typical waveforms may include a Gaussian pulse, Monocycle, Doublet, Gaussian derivatives, sine or cosine shaped pulses or others.

The pulse generation system comprises one or more PRF oscillators, wherein each PRF oscillator connected to a pulse generator for generating a pulse. That is, the pulse generation system may comprise one PRF oscillator connected to one or more pulse generators or a plurality of PRF oscillators, each PRF oscillator being connected to one or more pulse generators.

The pulse generation system may comprise a modulator. The modulator is configured to amplify or attenuate the pulse in accordance with the data to be transmitted, which may be comprised or be a part of a signal to be transmitted. That is, the modulator may be for encoding at least one of the one or more pulses with data. The modulator may be an amplitude modulator. The modulator may be a Pulse Amplitude Modulator (PAM), a Binary Phase-shift keying (BPSK) modulator an On-Off Keying (OOK) Modulator, a Pulse Position Modulator (PPM) or a Pulse Width Modulator (PWM), or any other suitable modulator. The modulator may be integrated with the pulse generator, or may be separate from the pulse generation system. Alternatively, each transmitter may comprise a modulator, in which case, the modulator may be positioned before or after the time delay block. In this way, a signal is split into the one or more pulses and data is encoded on each pulse. Each of the one or more pulses are transmitted so as to constructively interfere at a target region, thereby recreating the signal at the target location and communicating the data to a receiver at the target location.

The communication system may comprise a mixer. The mixer may be a frequency upconverter device that is configured to shift the frequency spectrum of the modulated pulse to the working frequency of the antenna, $f_c$. An advantage of using a frequency upconverter is that the originally generated pulse can be shifted to a higher frequency. Working at higher frequency has an advantage of reducing signal distortion due to non-linear wireless channel response (i.e., the different harmonic components of the signal are differently attenuated by the channel). Alternatively or additionally to the use of a mixer, the communication system may implement base-band transmission.

The communication system may comprise an amplifier. The amplifier may be configured to amplify a pulse by a predetermined gain value. The amplifier may be provided in each transmitter or as part of the pulse generation system. That is, the amplifier may amplify a pulse before it is sent to each transmitter or after a pulse has been sent to each transmitter. When part of the pulse generation system, the amplifier may be integrated with the pulse generator.

The communication system may be a single-pulse generation system. In this system, there is one PRF oscillator and one pulse generator connected to all of the transmitters. An advantage of the single-pulse generation system is that, since only one pulse is generated and may successively be amplified, the system guarantees synchronisation between the transmitted pulses.

The communication system may be a multiple-pulse generation system. In this system, each transmitter is connected to a PRF oscillator and a pulse generator. That is, each transmitter may have its own signal source.

An advantage of the multiple-pulse generation system is that each pulse generator can generate a pulse with a shape different from that of other pulse generators. This allows an additional degree of freedom, and therefore, additional security in the transmission of signals. However, this system also requires accurate and precise synchronisation between all of the pulse generators and transmitters.

According to a second aspect, the invention provides a method of communication comprising: generating, using a pulse generation system, one or more pulses, wherein the pulse generation system comprises one or more pulse repetition frequency (PRF) oscillators and one or more pulse generators, wherein each PRF oscillator is connected to a pulse generator, and wherein each pulse generator is configured to generate a pulse; sending the one or more pulses to three or more transmitters, wherein each transmitter receives one of the one or more pulses, and wherein each transmitter comprises: a pulse delay block configured to introduce a time delay to the pulse sent to the transmitter; and an antenna; introducing, using the pulse delay block, a time delay to each pulse in each transmitter; and transmitting, via the antenna, each pulse.

The method may comprise using the communication system the first aspect.

The method may use directional modulation for the communication of information.

The method may comprise encoding the one or more pulses with data. The data may be encoded into the one or more pulses via the pulse generation system. These encoded pulses are then sent to each of the transmitters for transmission by the antennas.

The method of the second aspect may be for transmitting information to an aircraft. The method may be used as part of a Single Pilot Operation (SPO) method. Additionally or alternatively, the method may be for transmitting information to a land- or water-based vehicle, and/or to a fixed receiver.

The method may use ultra-wideband (UWB) communications, wherein the antennas are UWB antennas configured to transmit UWB pulses.

There are three or more transmitters. The method may use four or more transmitters, five or more transmitters, six or more transmitters, seven or more transmitters, or eight or more transmitters. Various specific array sizes may comprise 10, 20, or 40 transmitters, depending on the needs of the system and the space available. An increase in the number of transmitters has an advantage of improving communications security.

The pulse generator is configured to generate a pulse that may then be sent to one or more of the transmitters. The method may comprise generating, at the pulse generator, a pulse having a short-duration waveform. Typical waveforms may include a Gaussian pulse, Monocycle, Doublet, Gaussian derivatives, sine or cosine shaped pulses or others.

The pulse generation system comprises one or more PRF oscillators, wherein each PRF oscillator connected to a pulse generator for generating a pulse. That is, the pulse generation system may comprise one PRF oscillator connected to one or more pulse generators or a plurality of PRF oscillators, each PRF oscillator being connected to one or more pulse generators.

The pulse generation system may comprise a modulator. The modulator is configured to amplify or attenuate the pulse in accordance with the data to be transmitted, which may be comprised or be a part of a signal to be transmitted. That is, the method may comprise encoding, using a modulator, at least one of the one or more pulses with data. The modulator may be an amplitude modulator. The modulator may be a Pulse Amplitude Modulator (PAM), a Binary Phase-shift keying (BPSK) modulator an On-Off Keying (OOK) Modulator, a Pulse Position Modulator (PPM) or a Pulse Width Modulator (PWM), or any other suitable modulator. The modulator may be integrated with the pulse generator, or may be separate from the pulse generation system. Alternatively, each transmitter may comprise a modulator, in which case, the modulator may be positioned before or after the time delay block. In this way, a signal is split into the one or more pulses and data is encoded on each pulse. Each of the one or more pulses are transmitted so as to constructively interfere at a target region, thereby recreating the signal at the target location and communicating the data to a receiver at the target location.

The method may comprise shifting, using a mixer, the frequency of the one or more pulses. The use of the mixer may occur before or after the at least one of the one or more pulses have passed though the modulator. The mixer may be a frequency upconverter device that is configured to shift the frequency spectrum of the modulated pulse to the working frequency of the antenna, $f_c$. An advantage of using a frequency upconverter is that the originally generated pulse can be shifted to a higher frequency. Working at higher frequency has an advantage of reducing signal distortion due to non-linear wireless channel response (i.e., the different harmonic components of the signal are differently attenuated by the channel). Alternatively or additionally to the use of a mixer, the method may implement base-band transmission.

The method may comprise amplifying, using an amplifier, at least one of the one or more pulses. The amplifier may be configured to amplify a pulse by a predetermined gain value. The amplifier may be provided in each transmitter or as part of the pulse generation system. When part of the pulse generation system, the amplifier may be integrated with the pulse generator.

BRIEF DESCRIPTION OF THE DRAWINGS

Certain embodiments of the invention will now be described by way of example only and with reference to the accompanying drawings in which.

DETAILED DESCRIPTION OF THE INVENTION

Figure 3:
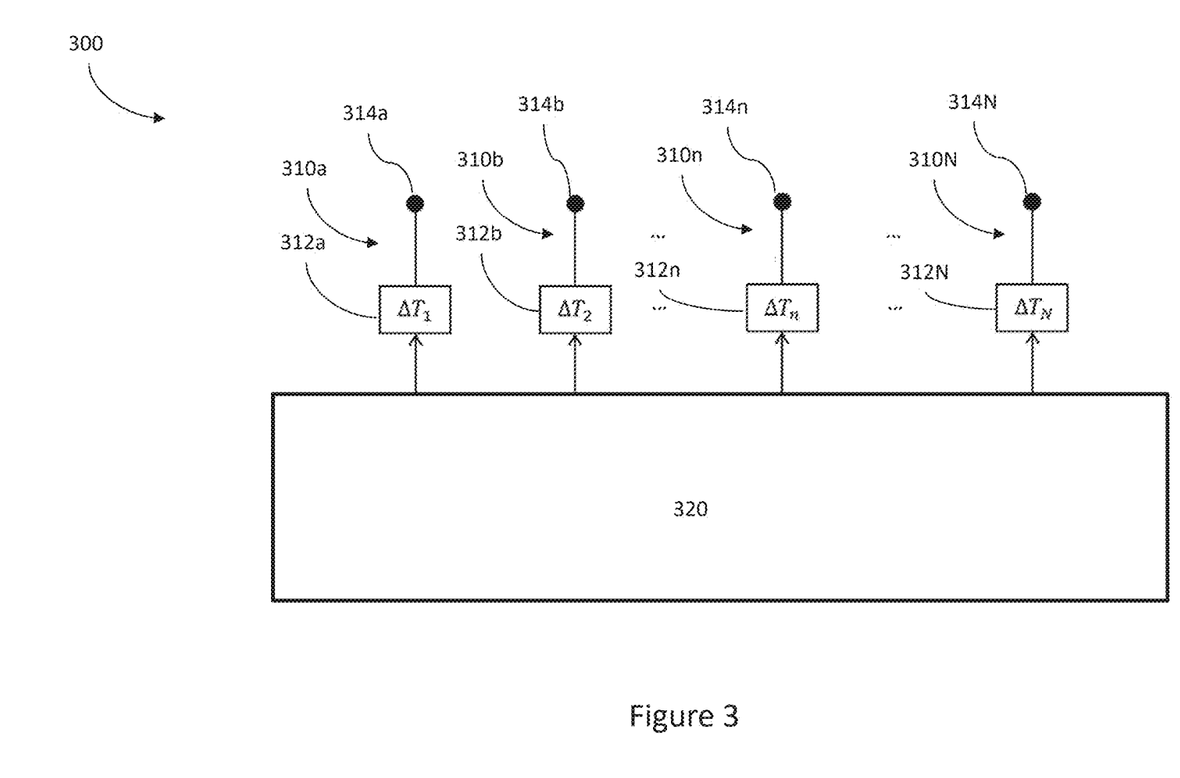
FIG. 3 shows a communication system.

FIG. 3 shows a communication system 300 comprising N transmitters 310a, 310b, . . . , 310n, . . . , 310N, wherein each transmitter is connected to a pulse generation system 320, and wherein N is at least three. The pulse generation system comprises one or more pulse repetition frequency (PRF) oscillators and each PRF oscillator is connected to a pulse generator for generating a pulse. The pulse generation system generates pulses that are sent to each of the transmitters 310a, 310b, . . . , 310n, . . . , 310N.

Each transmitter 310a, 310b, . . . , 310n, . . . , 310N comprises a delay block 312a, 312b, . . . , 312n, . . . , 312N and an antenna 314a, 314b, . . . , 314n, . . . , 314N. The delay block 312a, 312b, . . . , 312n, . . . , 312N is configured to introduce a time delay $\Delta T_n$; n=1, 2, . . . , n, . . . , N to each pulse in each transmitter before each pulse is transmitted by the respective antenna. Once transmitted, and as discussed above, there is a region in which all of the pulses add constructively such that the original signal can be reconstructed. The position of this region is determined in part by the time delay in each transmitter 310a, 310b, . . . , 310n, . . . , 310N.

The time delay introduced by each delay blocks in each transmitter 310a, 310b, . . . , 310n, . . . , 310N is adjustable. Adjusting the time delay in each delay block allows control over the position of the region in which the original signal can be constructed. A receiver for receiving the signal may be a moving receiver. Therefore, the time delay in each delay block can be controlled such that the communication system 300 can transmit a signal that tracks the position of a moving receiver.

Figure 4:
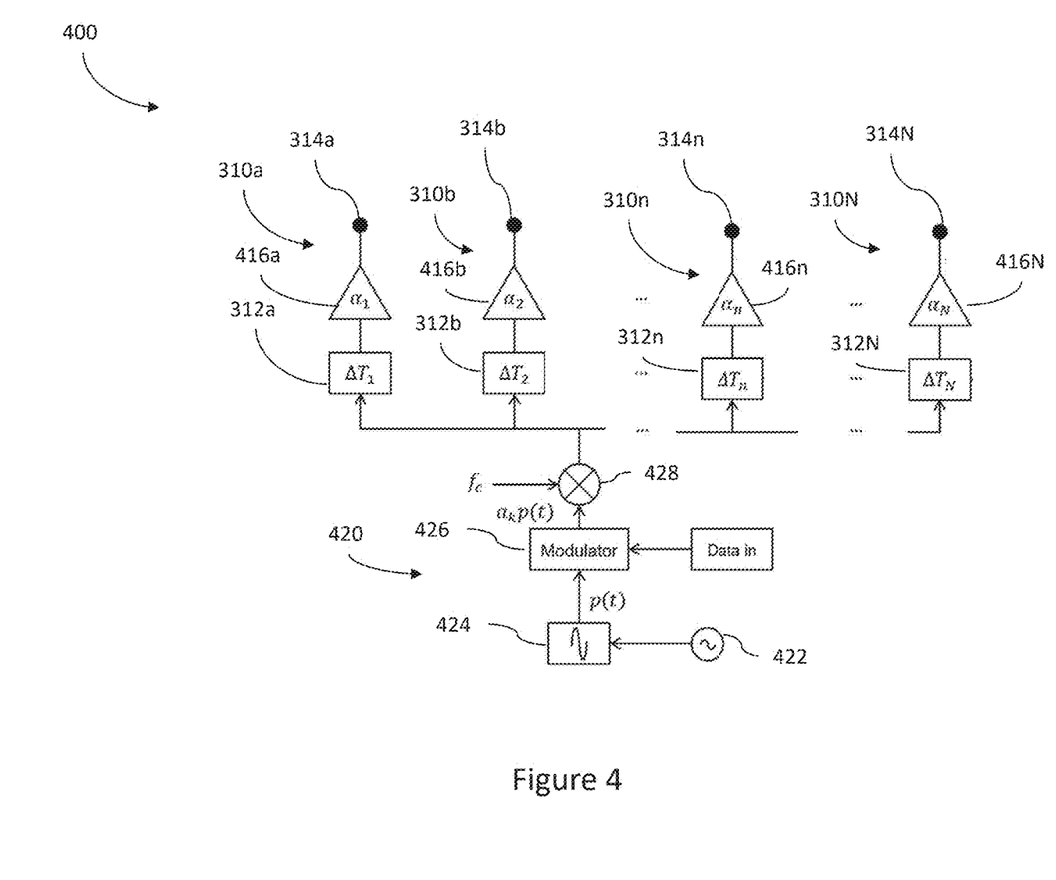
FIG. 4 shows a communication system with single-pulse generation architecture.

FIG. 4 shows a communication system 400 with single-pulse generation architecture. This communication system 400, like the communication system shown in FIG. 3, also comprises N transmitters 310a, 310b, . . . , 310n, . . . , 310N, wherein each transmitter is connected to a pulse generation system 420, and wherein N is at least three. The transmitters each comprise a delay block 312a, 312b, . . . , 312n, . . . , 312N, an amplifier 416a, 416b, . . . , 416n, . . . , 416N, and an antenna 314a, 314b, . . . , 314n, . . . , 314N.

In the communication system 400 of FIG. 4, the pulse generation system 420 comprises one pulse repetition frequency (PRF) oscillator 422 and one pulse generator 424 for generating a pulse, wherein the pulse generator 424 is connected to the PRF oscillator 422. The PRF oscillator 422 determines the pulse repetition frequency of the pulse generation system 420.

The pulse generator 424 is connected to a modulator 426. The modulator 426 is configured to amplify or attenuate a pulse sent from the pulse generator 424, thereby creating a modulated pulse. The amplification or attenuation is dependent on the data to be transmitted. That is, the data to be transmitted is encoded into the pulse by the modulator 426.

The modulated pulse is then sent to a mixer 428. In this communication 400 system, the mixer 428 is a frequency upconverter device that is configured to shift the frequency spectrum of the modulated pulse to the working frequency of the antenna, $f_c$.

The modulated pulse is then sent to each of the N transmitters 310a, 310b, ..., 310n, ..., 310N. That is, the modulated pulse is sent to each of the N pulse delay blocks 312a, 312b, ..., 312n, ..., 312N. The pulse delay block in each transmitter introduces a time delay $\Delta T_n$; n=1, 2, ..., n, ..., N to the pulse in each transmitter. The time delay is different in each transmitter and can be adjusted in each transmitter for beam steering, as discussed above.

Consider a first pulse in a first transmitter 310a. The pulse in the first transmitter 310a is sent from the delay block 312a to an amplifier 416a. The pulse is amplified by the amplifier 416a with a gain $\alpha_1$. That is, the pulse in each transmitter is amplified by a gain $\alpha_n$; n=1, ..., N. The pulse is then transmitted by the antenna 314a connected to the amplifier 416a. This process occurs in each transmitter 310a, 310b, ... 310n, ..., 310N.

Figure 5:
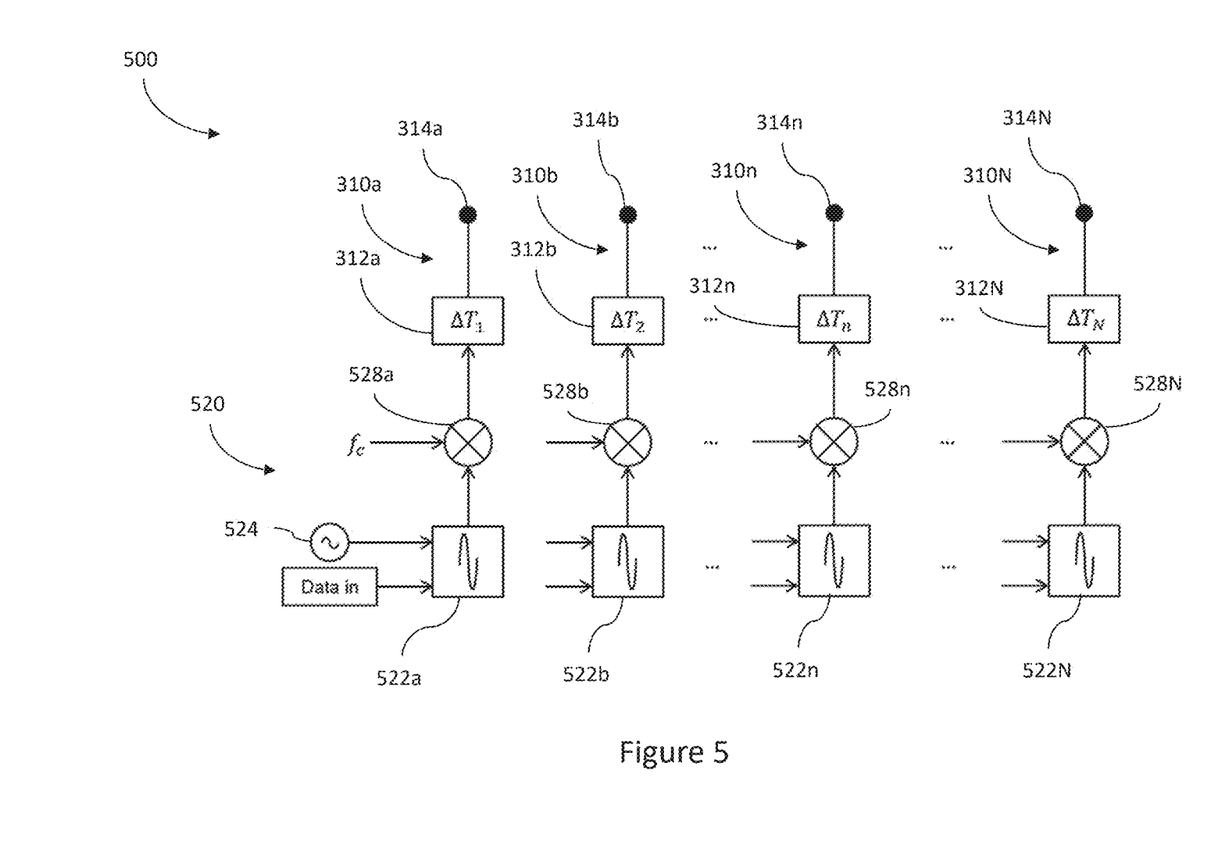
FIG. 5 shows a communication system with multiple-pulse generation architecture.

FIG. 5 shows a communication system 500 with multiple-pulse generation architecture. This communication system comprises N transmitters 310a, 310b, ..., 310n, ..., 310N, wherein each transmitter is connected to a pulse generation system 520, and wherein N is at least three. The transmitters 310a, 310b, ..., 310n, ..., 310N each comprise a delay block 312a, 312b, 312n, ..., 312N and an antenna 314a, 314b, ..., 314n, ..., 314N.

The pulse generation system comprises N pulse generators 522a, 522b, ..., 522n, ..., 522N where each pulse generator is connected to one transmitter. Each pulse generator is also connected to a PRF oscillator 524. In this communication system 500, each pulse generator also comprises an integrated modulator (not shown). Therefore, each pulse generator 522a, 522b, ..., 522n, ..., 522N is capable of outputting a modulated pulse to its connected transmitter.

Each modulated pulse is sent from each pulse generator to a mixer 528a, 528b, ..., 528n, ..., 528N. In this communication system 500, the mixer is a frequency upconverter device that is configured to shift the frequency spectrum of the modulated pulse to the working frequency of the antenna, $f_c$.

Each pulse is then sent from the mixer 528a, 528b, ..., 528n, ..., 528N to the connected delay block 312a, 312b, ..., 312n, ..., 312N. As with the previously described delay blocks, each delay block is configured to introduce a delay to each pulse. The delayed pulse is then sent to the antenna 314a, 314b, ..., 314n, ..., 314N of each transmitter 310a, 310b, ..., 310n, ..., 310N and is then transmitted by the antenna.

The invention claimed is:

1. A communication system comprising:
a pulse generation system configured to generate three or more pulses, the pulse generation system comprising one or more pulse repetition frequency (PRF) oscillators and one or more pulse generators, wherein each PRF oscillator is connected to a pulse generator configured to generate at least one pulse of the three or more pulses, and wherein each pulse generator is connected to a modulator, wherein the modulator is configured to one of amplify or attenuate the at least one pulse generated by the pulse generator based on a signal to be transmitted; and
three or more transmitters, wherein each transmitter is connected to the pulse generation system and wherein the pulse generation system is configured to send the at least one pulse to each transmitter, each transmitter comprising:
a pulse delay block configured to introduce a time delay to the at least one pulse sent to the transmitter; and
an antenna configured to transmit the at least one pulse sent to the transmitter,
wherein the signal to be transmitted is split across each antenna of the three or more transmitters, wherein the at least one pulse sent to each transmitter represents a portion of the signal to be transmitted.

2. The communication system of claim 1, wherein each transmitter comprises an amplifier or wherein each pulse generator comprises an amplifier.

3. The communication system of claim 1, wherein the modulator is a Pulse Amplitude Modulator (PAM), a Binary Phase-shift keying (BPSK) modulator, an On-Off Keying (OOK) Modulator, a Pulse Position Modulator (PPM), or a Pulse Width Modulator (PWM).

4. The communication system of claim 1, wherein the pulse generation system comprises one or more mixers, wherein each mixer is connected to each pulse generator.

5. The communication system of claim 4, wherein the one or more mixers are a frequency upconverter.

6. The communication system of claim 1, wherein each antenna is an ultra-wideband (UWB) antenna.

7. The communication system of claim 1, wherein each pulse generator is configured to generate a pulse having one of the following waveforms: Gaussian, monocycle, doublet, Gaussian derivatives, or a sine wave.

8. The communication system of claim 1, wherein the pulse generation system comprises one PRF oscillator connected to one pulse generator.

9. The communication system of claim 1, wherein the pulse generation system comprises three or more PRF oscillators and three or more pulse generators, wherein each PRF oscillator is connected to one pulse generator, and wherein each pulse generator is connected to one transmitter.

10. The communication system of claim 1, wherein a distance between each transmitter is at least 30 millimetres.

11. The communication system of claim 1, wherein each pulse generator is configured to generate a pulse having a duration between 0.1 to 2 nanoseconds.

12. The communication system of claim 1, wherein the communication system is configured for transmitting a signal to an aircraft.

13. A method of communication comprising:
generating, using a pulse generation system, three or more pulses, wherein the pulse generation system comprises one or more pulse repetition frequency (PRF) oscillators and one or more pulse generators, wherein each PRF oscillator is connected to a pulse generator configured to generate at least one pulse of the three one or more pulses, and wherein each pulse generator is connected to a modulator;

encoding, using the modulator, each of the three or more pulses with data by one of amplifying or attenuating the three or more pulses based on a signal to be transmitted, wherein each of the three or more encoded pulses represents a portion of the signal to be transmitted;

sending the three or more encoded pulses to three or more transmitters, wherein each transmitter receives one of the three or more encoded pulses, and wherein each transmitter comprises:
   a pulse delay block configured to introduce a time delay to the encoded pulse sent to the transmitter; and
   an antenna configured to transmit the encoded pulse sent to the transmitter;

wherein the signal to be transmitted is split across each antenna of the three or more transmitters;

introducing, using the pulse delay block, a time delay to each encoded pulse in each transmitter; and transmitting, via the antenna, each encoded pulse.

14. The method of claim 13, wherein each transmitter comprises an amplifier or wherein each pulse generator comprises an amplifier.

15. The method of claim 13, wherein the pulse generation system comprises one or more mixers, wherein each mixer is connected to each pulse generator.

16. The method of claim 13, wherein the pulse generation system comprises one PRF oscillator connected to one pulse generator.

17. The method of claim 13, wherein the pulse generation system comprises three or more PRF oscillators and three or more pulse generators, wherein each PRF oscillator is connected to one pulse generator, and wherein each pulse generator is connected to one transmitter.

* * * * *